(12) United States Patent
Koike et al.

(10) Patent No.: US 7,448,194 B2
(45) Date of Patent: Nov. 11, 2008

(54) MOWER DECK WITH VENTILATION HOLE

(75) Inventors: Kazuo Koike, Kobe (JP); Masatoshi Yamaguchi, Izumi (JP); Akihito Sugio, Kakogawa (JP); Kazuo Samejima, Kaizuka (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 11/726,357

(22) Filed: Mar. 21, 2007

(65) Prior Publication Data

US 2008/0053056 A1 Mar. 6, 2008

(30) Foreign Application Priority Data

Aug. 29, 2006 (JP) ............................. 2006-232179
Sep. 19, 2006 (JP) ............................. 2006-252809

(51) Int. Cl.
*A01D 67/00* (2006.01)
(52) U.S. Cl. ...................................... 56/320.1
(58) Field of Classification Search ............... 56/320.1, 56/320.2, 17.4, 16.7, 17.5
See application file for complete search history.

(56) References Cited

U.S. PATENT DOCUMENTS

| 4,829,754 | A | * | 5/1989 | Shimamura et al. ........... 56/15.9 |
| 5,457,947 | A | * | 10/1995 | Samejima et al. ............ 56/16.7 |
| 6,205,754 | B1 | * | 3/2001 | Laskowski ................... 56/15.1 |
| 6,832,468 | B2 | * | 12/2004 | Weinlader ................... 56/320.1 |
| 6,935,446 | B2 | * | 8/2005 | Walker ........................ 180/6.48 |
| 7,089,722 | B2 | * | 8/2006 | Laskowski ................... 56/14.9 |
| 7,293,398 | B2 | * | 11/2007 | Koehn ......................... 56/15.9 |
| 7,347,039 | B2 | * | 3/2008 | Koehn ......................... 56/15.9 |
| 2002/0104301 | A1 | * | 8/2002 | Langworthy et al. ........ 56/320.2 |
| 2003/0154705 | A1 | * | 8/2003 | Sugden et al. ............. 56/320.1 |

FOREIGN PATENT DOCUMENTS

| JP | 07327450 A | * | 12/1995 |
| JP | 09094022 A | * | 4/1997 |
| JP | 2003125626 |   | 5/2003 |
| JP | 2005160352 |   | 6/2005 |
| JP | 2005253387 A | * | 9/2005 |
| JP | 2006020531 |   | 1/2006 |

* cited by examiner

*Primary Examiner*—Árpád Fábián-Kovács
(74) *Attorney, Agent, or Firm*—The Webb Law Firm

(57) ABSTRACT

A mower comprising: a cutting blade housing; rotating cutting blades; a rear plate disposed rearwardly the rotating cutting blades; a rear vertical wall that is supported by the cutting blade housing and that forms a first ventilation hole in a center portion in the transverse direction of the cutting blade housing.

8 Claims, 7 Drawing Sheets

MOWER DECK WITH VENTILATION HOLE

BACKGROUND OF THE INVENTION

1. Field of the Invention

The present invention relates to a mower having a housing for covering a plurality of cutting blades.

2. Description of the Related Art

A conventional example of this type of mower is disclosed in JP 2005-253387.

The mower disclosed in JP 2005-253387 is provided with a ground unit in the form of a panel that is connected between a rear baffle plate and the center portion of a rear vertical wall of a mower deck in the transverse direction of the mower deck. Specifically, even when an obstacle is encountered on the ground surface, the ground unit moves over the obstacle and supports the rear end portion of the mower deck near the ground, and it is easy to prevent the mower deck from colliding with the obstacle.

In this type of mower, air from the outside of the cutting blade housing is drawn in by a rotating cutting blade to create an airflow, and turf or grass is cut while being caused to stand upright. The mowing performance or efficiency is therefore enhanced in order to facilitate the introduction of air. However, when the conventional technique described above is applied, even when a ventilation hole is provided to the rear vertical wall of the cutting blade housing to facilitate air introduction, the ground unit impedes the airflow, and satisfactory results are difficult to obtain

SUMMARY OF THE INVENTION

An object of the present invention is to overcome the drawbacks of the conventional mower described above.

The mower according to the present invention comprises:

a cutting blade housing having a top plate, a front vertical wall that depends from the top plate, and a cut-grass discharge port at one transverse end;

rotating cutting blades that are arranged in a transverse direction within said cutting blade housing and each of which is capable of rotating about a vertical axis;

a rear plate disposed behind said rotating cutting blades and along rotation zones of said rotating cutting blades;

a rear vertical wall that is supported by said cutting blade housing in a position rearwardly of said rear plate and that forms a first ventilation hole in a center portion in said transverse direction of said cutting blade housing;

an obstacle-surmounting ground unit for supporting a rear end portion of said cutting blade housing; and a supporting portion for supporting said ground unit so that at least a portion of said obstacle-surmounting ground unit protrudes from said ventilation hole to the rear of said ventilation hole.

DESCRIPTION OF THE PREFERRED EMBODIMENTS

Preferred embodiments of the present invention will be described hereinafter based on the accompanying drawings.

Figure 1:
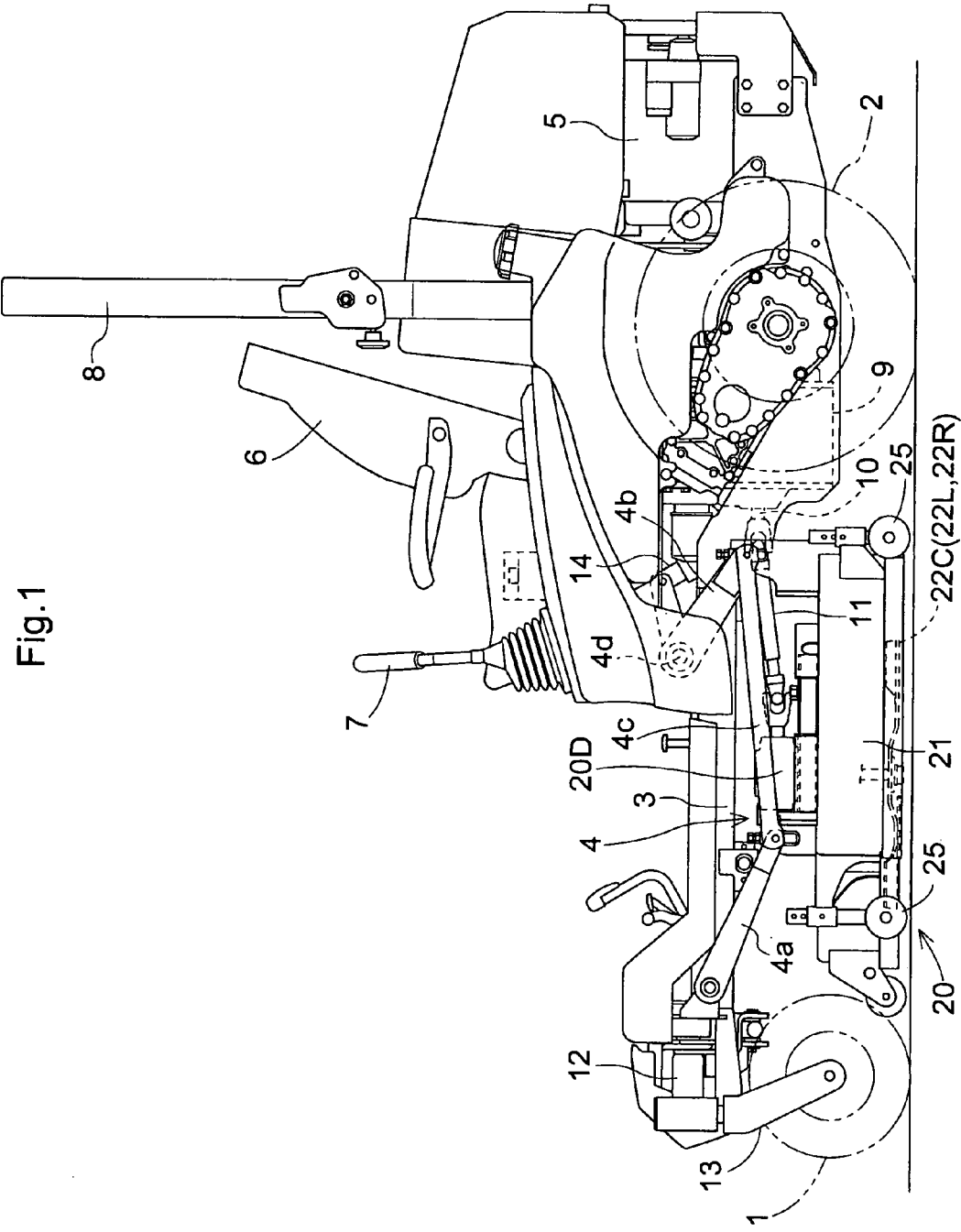
FIG. 1 is a side view showing the entire riding mower.
Figure 2:
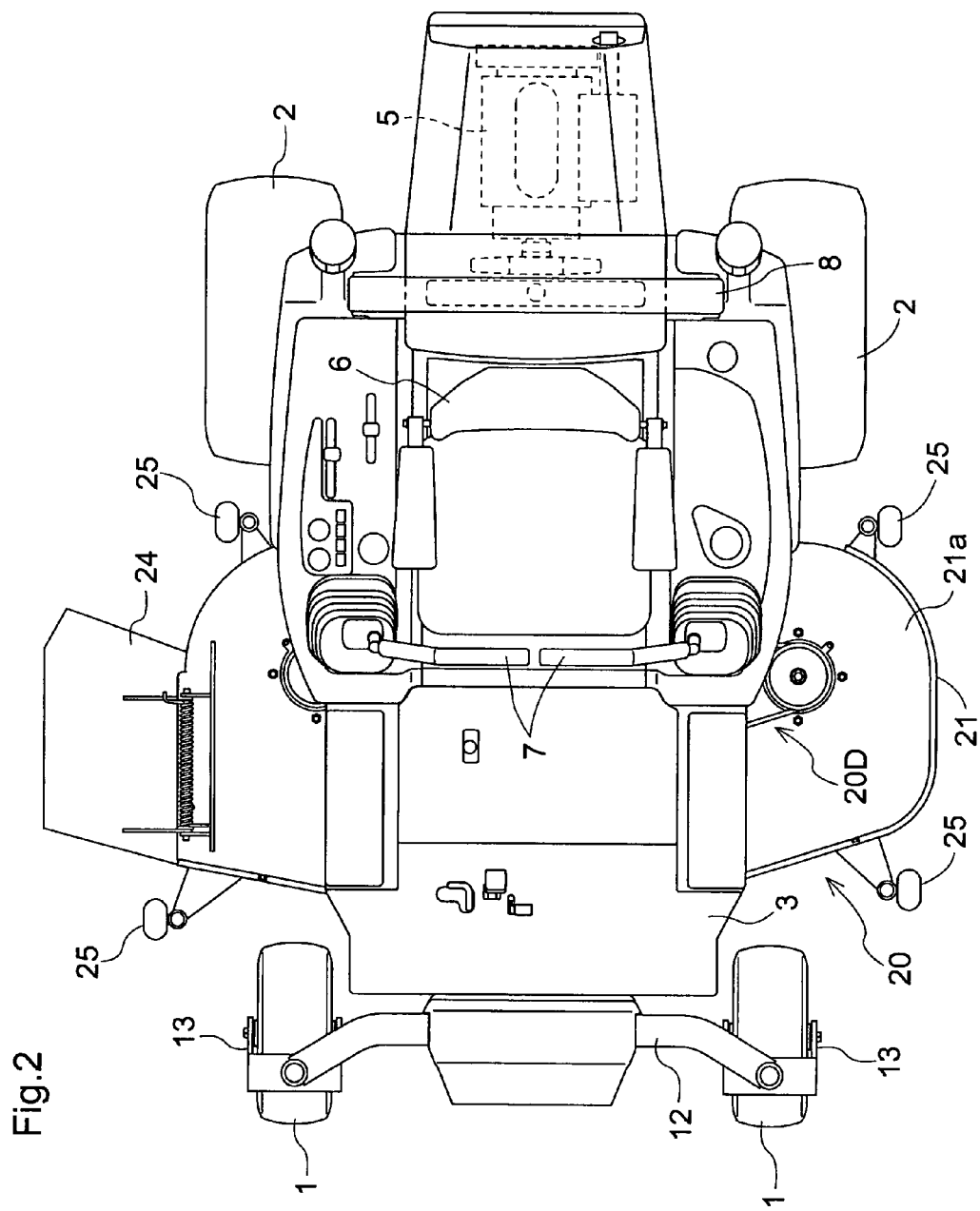
FIG. 2 is a plan view showing the entire riding mower.

FIG. 1 is a side view showing the entire riding mower. FIG. 2 is a plan view showing the entire riding mower. As shown in these drawings, the riding mower is provided with a self-propulsion unit having a pair of left and right front wheels 1, 1 and a pair of left and right rear wheels 2, 2; and a mower 20 according to the present invention that is mounted between the front wheels 1 and the back wheels 2 of a body frame 3 of the self-propulsion unit via a link mechanism 4.

The riding mower performs a grass mowing operation.

Specifically, during operation of a raising and lowering cylinder 14 connected to a support shaft 4d that supports a pair of left and right rear pivot links 4b, 4b of the link mechanism 4 so that the pair can pivot in an integral fashion, the link mechanism 4 is swung upward and downward in relation to the body frame 3 by the lifting and lowering cylinder 14, and the mower 20 is raised and lowered between a lowered working state in which a gauge shaft 25 is in contact with the ground surface, and a raised non-working state in which the gauge shaft 25 is raised from the ground surface. When the mower 20 is placed in the lowered working state, and the self-propulsion unit is caused to travel, the mower 20 cuts grass or turf using three rotating cutting blades 22L, 22C, 22R (see FIG. 3) positioned within a cutting blade housing 21. The cut grass or cut turf is conveyed through the inside of the cutting blade housing 21 by wind generated by the rotation of the rotating cutting blades 22L, 22C, 22R to a cut-grass discharge port 23 (see FIG. 3) positioned at one transverse end of the cutting blade housing 21, and the cut grass is discharged from the side of the self-propulsion unit while being guided from the cut-grass discharge port 23 by a discharge guide 24.

The self-propulsion unit will be described in detail.

The self-propulsion unit is provided with the aforementioned pair of left and right front wheels 1, 1 and the pair of left and right rear wheels 2, 2, as well as with a drive source unit having an engine 5 mounted to the rear portion of the body; an operating unit having a driver seat 6 and a pair of left and right control levers 7, 7; a roll protection frame 8 positioned near the back of the driver seat 6; a transmission device 9 that supports the left and right rear wheels 2, 2; and a rotating shaft 11 whereby the drive force of a drive power shaft 10 positioned at the front of the transmission device 9 is transmitted to a cutting blade drive mechanism 20D of the mower 20. The left and right front wheels 1 are supported via a front wheel support fork 13 so as to be able to idle at the end portion of a front wheel support frame 12 that is connected to the front portion of the body frame 3. The left and right front wheels 1 are steered from side to side in relation to the front wheel support frame 12 along with the front wheel support fork 13. The left and right rear wheels 2, 2 are driven separately by a pair of hydrostatic transmission devices (not shown) provided to the transmission device 9, and are independently stopped and accelerated forward and backward by the independent accelerating action of the pair of hydrostatic transmission devices via a pair of left and right control levers 7, 7.

The link mechanism 4 will next be described in detail.

The link mechanism 4 is composed of a pair of left and right front pivot links 4a, 4a that are connected over the front ends of the body frame 3 and the cutting blade housing 21 of the mower 20 so that the front end of the mower 20 can be raised and lowered by the body frame 3; a pair of left and right rear pivot links 4b, 4b that are connected over the rear ends of the body frame 3 and the cutting blade housing 21 so that the rear end of the mower 20 can be raised and lowered by the body frame 3; and a coupling link 4c that is connected between the front pivot links 4a and the rear pivot links 4b on the left and right sides.

Figure 3:
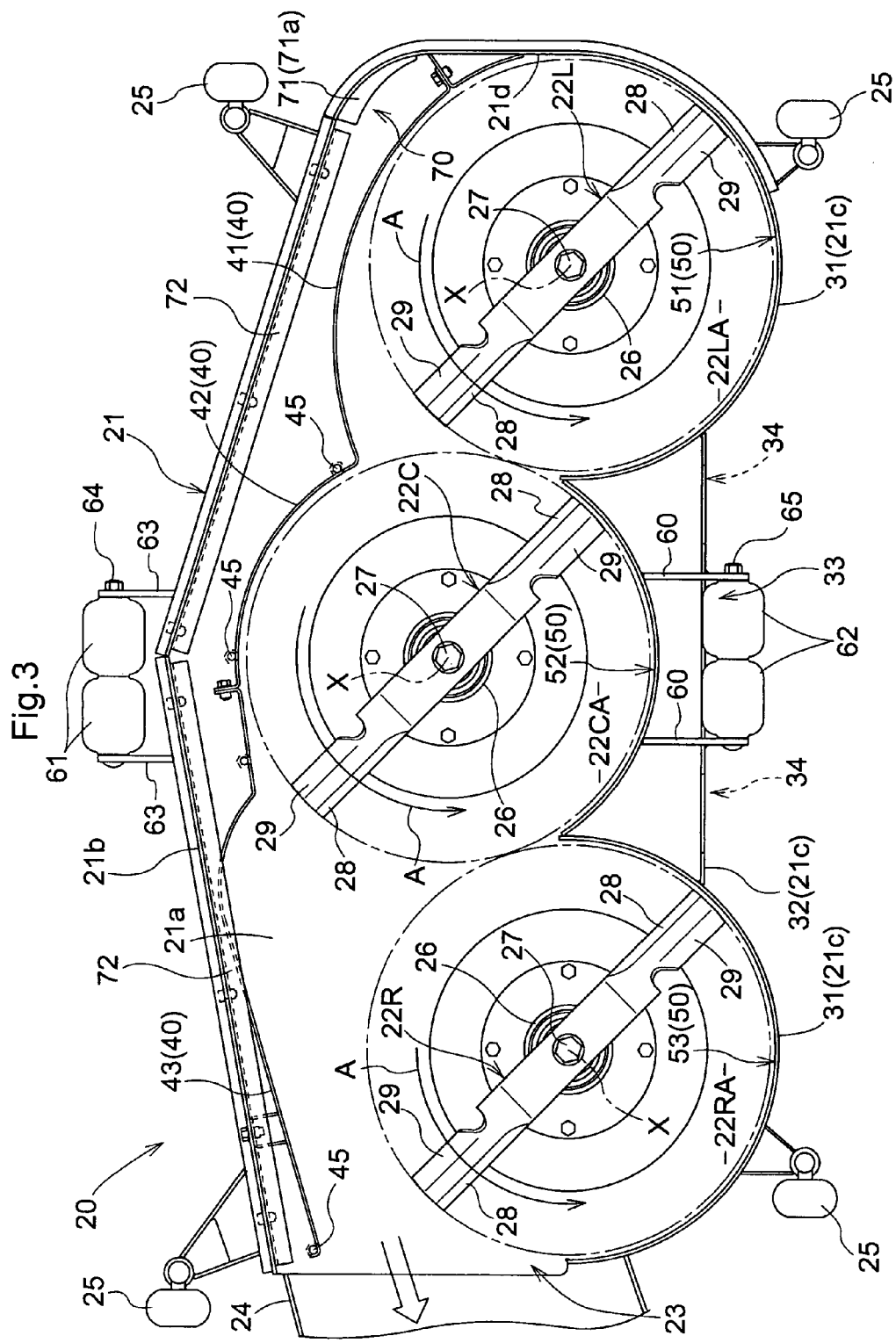
FIG. 3 is a bottom view showing the mower.
Figure 4:
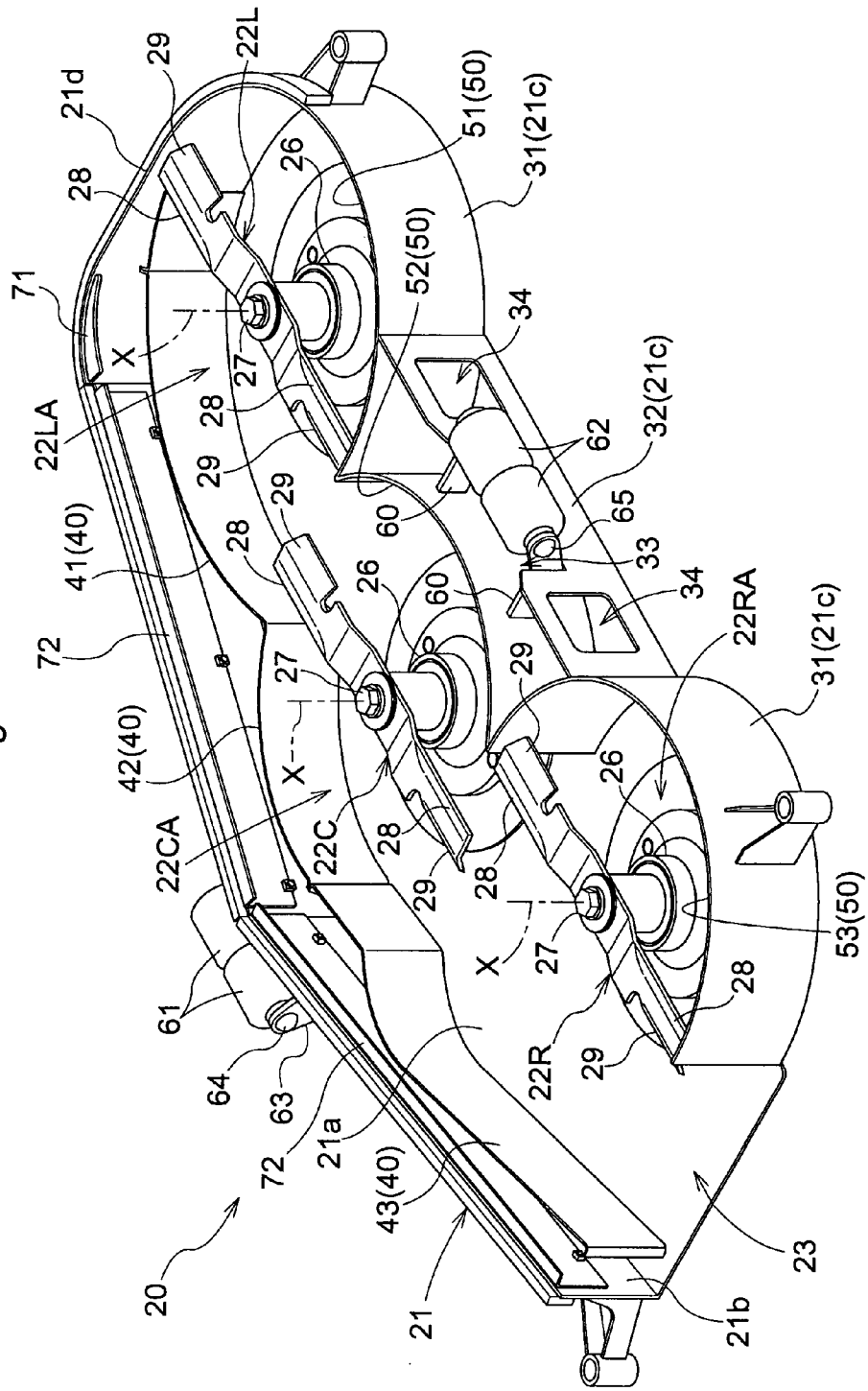
FIG. 4 is a perspective view showing the mower.

The mower 20 will next be described in detail. FIG. 3 is a bottom view of the mower 20. FIG. 4 is a perspective view from the bottom side of the mower 20.

As shown in the drawings, the mower 20 is provided with the cutting blade housing 21, the three rotating cutting blades 22L, 22C, 22R, the cut-grass discharge port 23, and the gauge shaft 25, as well as a front baffle plate 40 provided in front of the rotating cutting blades 22L, 22C, 22R and inside the cutting blade housing 21, and a rear baffle plate 50 provided behind the rotating cutting blades 22L, 22C, 22R and inside the cutting blade housing 21.

The cutting blade housing 21 is composed of a top plate 21a, a front vertical wall 21b that extends below the cutting blade housing from the chevron-shaped front edge portion of the top plate 21a, a rear vertical wall 21c that extends below the cutting blade housing from the rear edge portion of the top plate 21a, and a transverse vertical wall 21d that extends below the cutting blade housing from the transverse end portion of the top plate 21a. The cutting blade housing 21 is in the shape of a container that opens downward from the self-propulsion unit. The rear vertical wall 21c is provided with arcuate end portion walls 31 positioned at both end portions of the rear vertical wall 21c in the transverse direction of the cutting blade housing that have an arcuate shape as viewed in the vertical direction of the cutting blade housing, and a linear middle wall portion 32 that is positioned between the pair of arcuate end portion walls 31, 31 and is linear as viewed in the vertical direction of the cutting blade housing. The middle wall portion 32 of the rear vertical wall may be welded, bolted, or otherwise fastened by a conventional method to only the arcuate end portion walls 31, or may be fixed to the top plate 21a. The cut-grass discharge port 23 of the cutting blade housing 21 is formed by the end portions of the top plate 21a, the front vertical wall 21b, and the rear vertical wall 21c.

As shown in FIGS. 3, 4, 8, and 9, the rear vertical wall 21c has a ventilation hole 33 provided in the center region of the linear middle wall portion 32, which is a region positioned in the center portion of the rear vertical wall 21c in the transverse width direction of the cutting blade housing; and second ventilation holes 34 provided to the linear middle wall portion 32 and disposed on both sides of the ventilation hole 33. The second ventilation holes 34 and the ventilation hole 33 are positioned in relation to each other so as to be on both sides of a support member 60 that is closer to the second ventilation holes 34 and is one of a pair of left and right sheet-metal support members 60, 60 that are inserted through the ventilation hole 33 and connected across the linear middle wall portion 32 and the portion 52 of the rear baffle plate 50 that corresponds to the center cutting blade. The second ventilation holes 34 are disposed near the support members 60 on the other side from the ventilation hole 33.

As shown in FIGS. 3 and 4, the three rotating cutting blades 22L, 22R, 22C within the cutting blade housing 21 are arranged in the transverse direction of the cutting blade housing The rotating cutting blades 22L, 22C, 22R are supported so as to be able to rotate in integral fashion with the lower end portions of cutting blade drive shafts 27 that are supported so as to be able to rotate via support members 26 formed by bearing support cases in the top plate 21a of the cutting blade housing 21. The rotating cutting blades 22L, 22C, 22R thereby rotate along with the cutting blade drive shafts 27 about the central axes X that extend in the vertical direction of the cutting blade housing in which the cutting blade drive shafts 27 are provided. The rotating cutting blades 22L, 22C, 22R have cutting blades 28 that are provided to both end portions of the rotating cutting blades 22L, 22C, 22R; and wind-generating vanes 29 that are provided behind the cutting blades 28.

Figure 5:
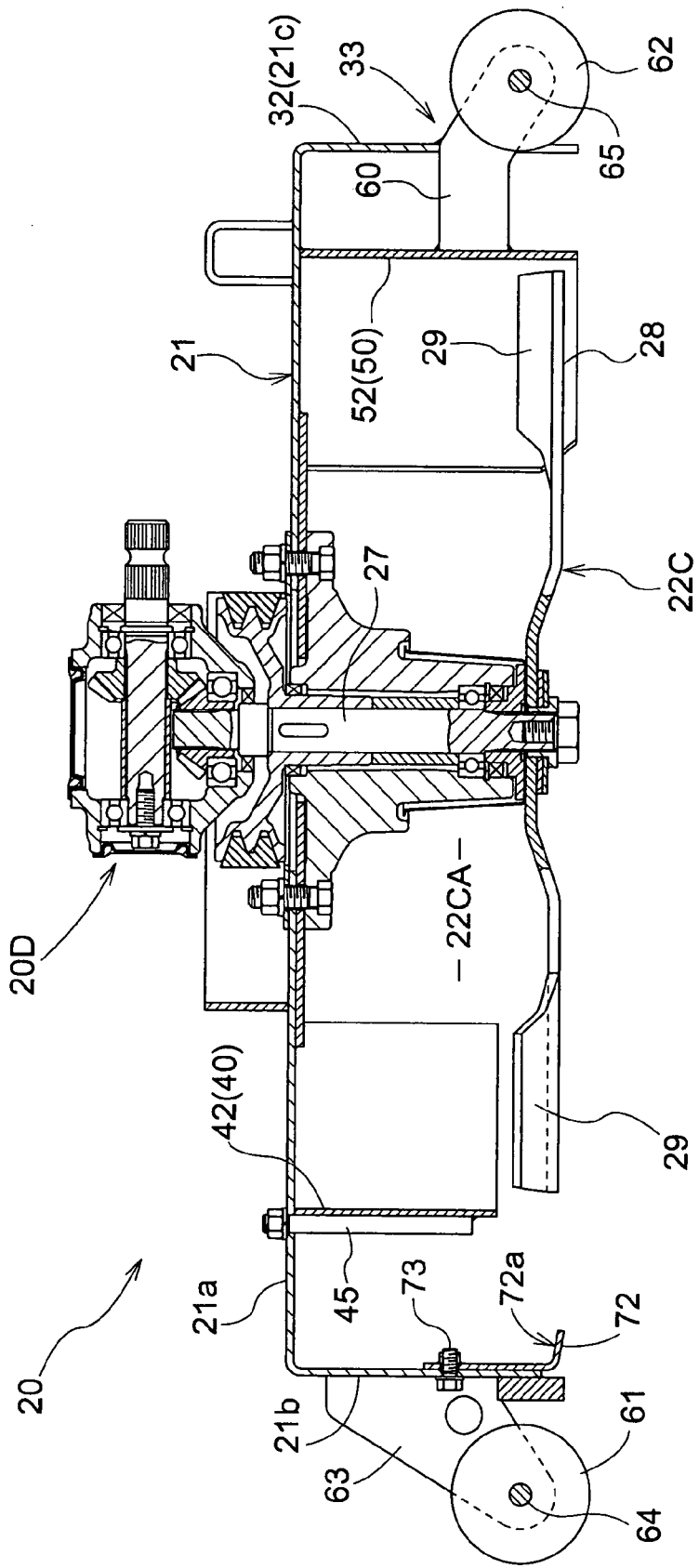
FIG. 5 is a vertical side view showing the mower.
Figure 7:
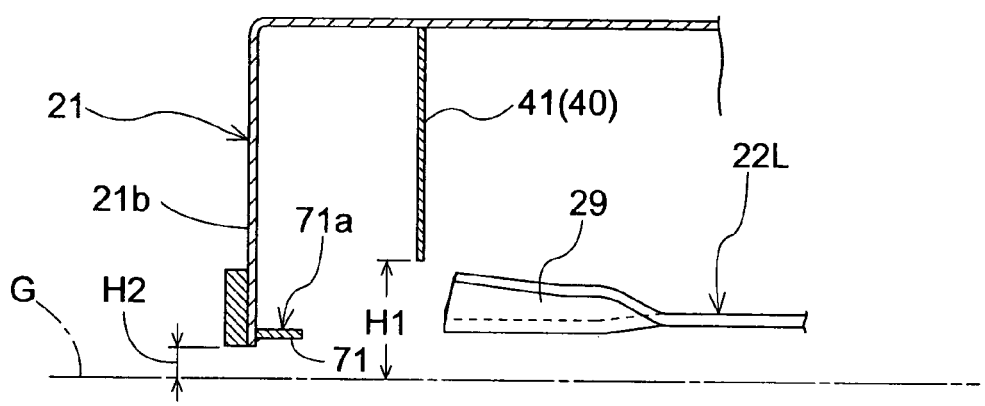
FIG. 7 is a sectional view along arrow VII-VII in FIG. 6.
Figure 8:
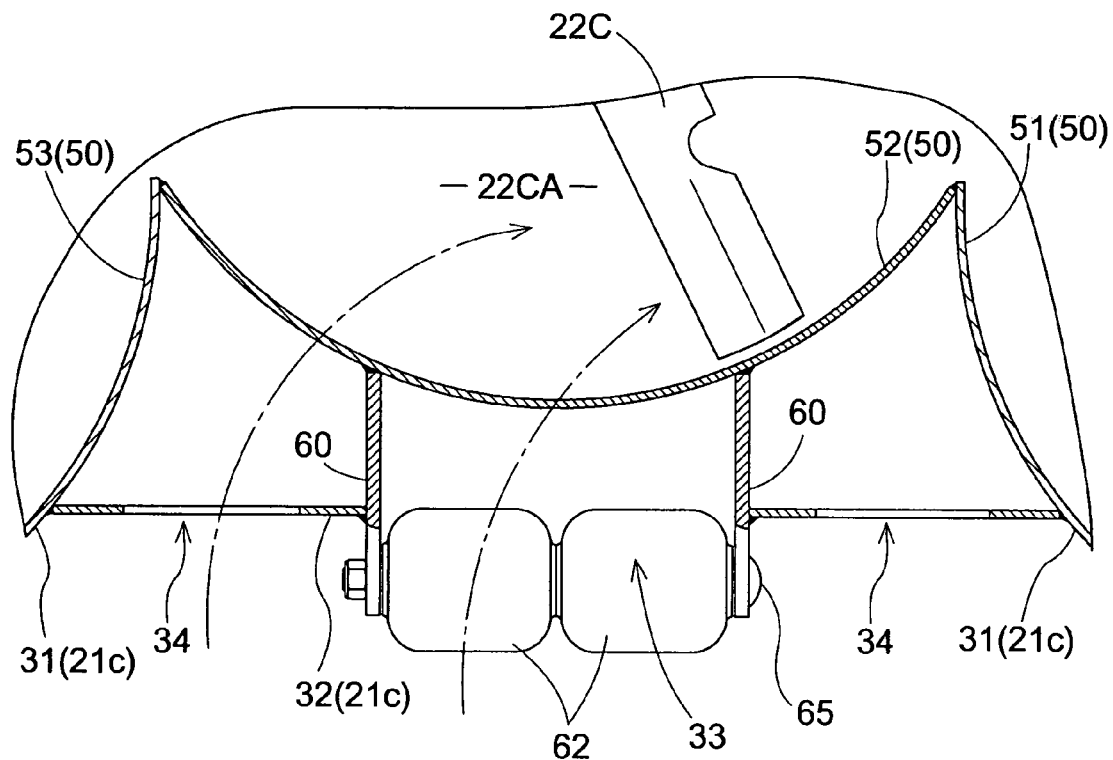
FIG. 8 is a sectional view showing the portion in which the rear ground rollers of the mower are provided.
Figure 9:
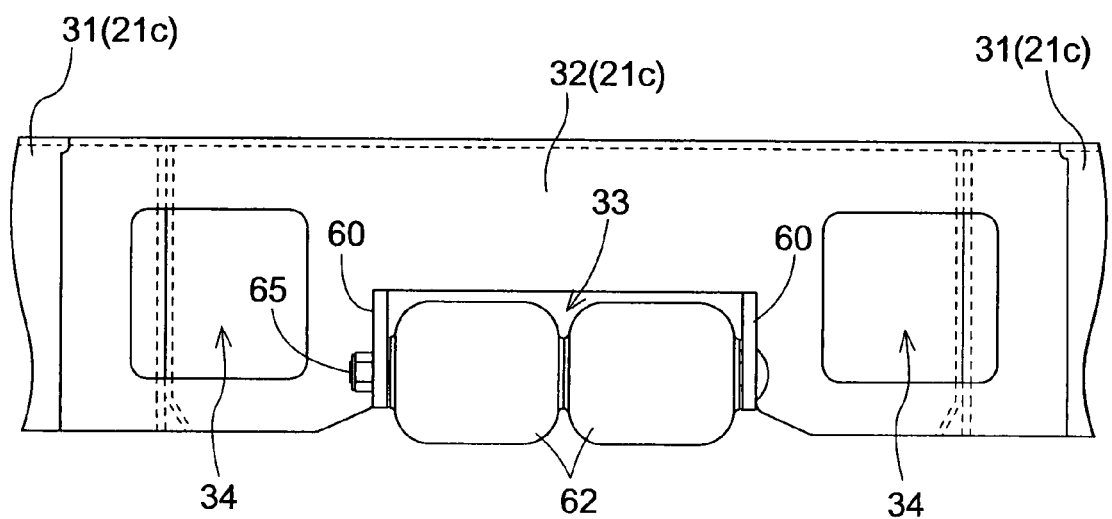
FIG. 9 is a sectional view showing the portion in which the rear ground rollers of the mower are provided.

The front baffle plate 40 is provided with a corresponding portion 41 designed for the side cutting blade and positioned in front of and in proximity to a rotating cutting blade 22L on the side opposite the discharge side. The rotating cutting blade 22L of the three rotating cutting blades 22L, 22C, 22R is positioned at the end on the opposite side from the side on which the cut-grass discharge port 23 is positioned. The front baffle plate 40 is also provided with a corresponding portion 42 designed for the center cutting blade and positioned in front of and in proximity to a center rotating cutting blade 22C in the center position of the three rotating cutting blades 22L, 22C, 22R; and a corresponding portion 43 designed for the side cutting blade and positioned in front of a discharge-side rotating cutting blade 22R, which is one the three rotating cutting blades 22L, 22C, 22R and is positioned at the end on which the cut-grass discharge port 23 is positioned. The corresponding portion 41 for the side cutting blade has a substantially arcuate shape at the front portion of the rotation zone 22LA of the rotating cutting blade 22L on the side opposite the discharge side as viewed in the vertical direction of the cutting blade housing. The corresponding portion 42 for the center cutting blade has a substantially arcuate shape at the front portion of the rotation zone 22CA of the center rotating cutting blade 22C as viewed in the vertical direction of the cutting blade housing. The corresponding portion 43 for the side cutting blade is placed at a considerable distance forward in relation to the rotation zone 22RA of the discharge-side rotating cutting blade 22R. The corresponding portion 43 for the side cutting blade has an arcuate shape as viewed in the vertical direction of the cutting blade housing at the end portion thereof on the side connected to the corresponding portion 42 for the center cutting blade, and the other portion thereof has a linear shape as viewed in the vertical direction of the cutting blade housing. The front baffle plate 40 is connected to the top plate 21a of the cutting blade housing 21 by fastening rods 45 connected in a plurality of locations in the longitudinal direction of the front baffle plate 40. As shown in FIGS. 5 and 7, the height H1 at which the lower end of the front baffle plate 40 is positioned is greater than the height H2 at which the lower end of the front vertical wall 21b is positioned, so that the gap between the front baffle plate 40 and the ground surface G is larger than the gap between the front vertical wall 21b and the ground surface G The rear baffle plate 50 has a portion 51 that corresponds to the rotating cutting blade 22L on the side opposite the discharge side, a portion 52 that corresponds to the center rotating cutting blade 22C, and a portion 53 that corresponds to the discharge-side rotating cutting blade 22R. The portion 51 that corresponds to the side cutting blade has an arcuate shape that conforms to the rotation zone 22LA of the rotating cutting blade 22L on the side opposite the discharge side as viewed in the vertical direction of the cutting blade housing. Part of the portion 51 that corresponds to the side cutting blade is formed by the arcuate end portion walls 31. The portion 52 that corresponds to the center cutting blade has an arcuate shape that conforms to the rotation zone 22CA of the center rotating cutting blade 22C as viewed in the vertical direction of the cutting blade housing. The portion 53 that corresponds to the side cutting blade has an arcuate shape that conforms to the rotation zone 22RA of the discharge-side rotating cutting blade 22R as viewed in the vertical direction of the cutting blade housing. Part of the portion 53 that corresponds to the side cutting blade is formed by the arcuate end portion walls 31.

Figure 6:
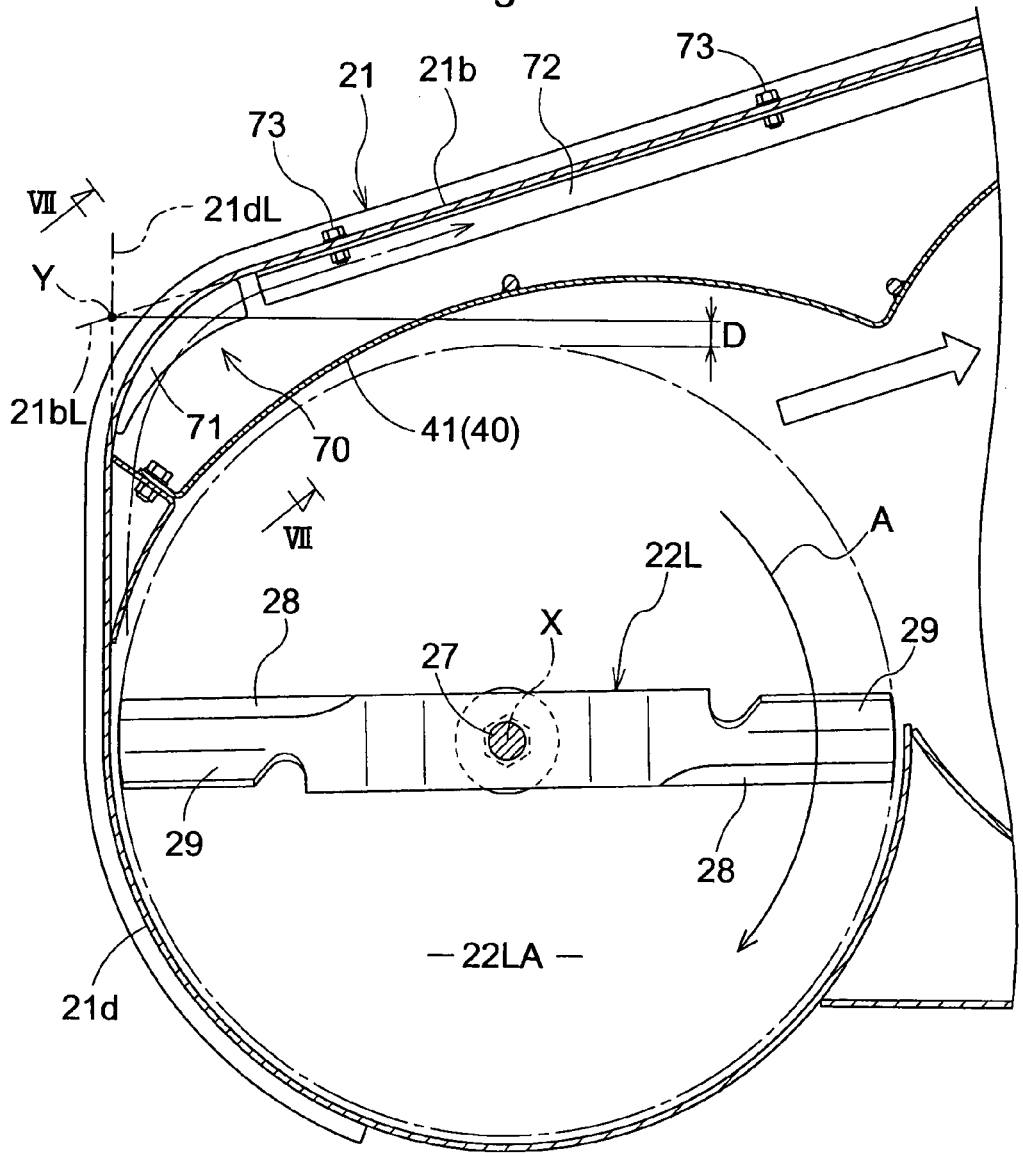
FIG. 6 is a plan view showing a transverse end portion of the mower.

The transverse end portion on the opposite side from the cut-grass discharge port 23 of the cutting blade housing 21 is configured as shown in FIG. 6. A corner portion 70 is formed inside the cutting blade housing 21 by the transverse vertical wall 21d and the front vertical wall 21b as shown in FIG. 6, and the transverse end portion is also formed in a state in which the intersection point Y of an extension line 21dL in the linear portion of the transverse vertical wall 21d and an extension line 21bL in the linear portion of the front vertical wall 21b is positioned at a distance D in front of the cutting blade housing from the rotation zone 22LA of the rotating cutting blade 22L on the side opposite the discharge side.

As shown in FIGS. 3 and 4, the cutting blade housing 21 has a corner guide 71 provided to the corner portion 70 of the cutting blade housing 21, and a guide 72 provided along the front vertical wall 21b between the corner guide 71 and the cut-grass discharge port 23. FIG. 6 shows the structure of the corner guide 71 as viewed from the bottom, and FIG. 7 shows a transverse cross-sectional view of the structure of the corner guide 71. As shown in these drawings, the corner guide 71 is composed of a panel that connects the end portions of the lower end portions of the front vertical wall 21b and the lower end portion of the transverse vertical wall 21d. The corner guide 71 forms a bottom surface 71a in the corner portion 70 that faces upward in relation to the cutting blade housing. The bottom surface 71a is positioned further forward than the end portion of the portion 41 of the front baffle plate 40 that corresponds to the side cutting blade, and at a lower height than the lower end of the front baffle plate 40.

In other words, the corner guide 71 is configured so that wind, which is generated by the rotation of wind-generating vanes 29 of the rotating cutting blade 22L on the side opposite the discharge side, and which enters the corner portion 70 from the rotation zone 22LA through the area under the portion 41 of the front baffle plate 40 that corresponds to the side cutting blade, is guided by the bottom surface 71a so as to flow along the transverse vertical wall 21d and the front vertical wall 21b towards the cut-grass discharge port 23.

FIGS. 3 and 6 show the structure of the guide 72 as viewed from the bottom, and FIG. 5 shows a transverse cross-sectional view of the structure of the guide 72. As shown in these drawings, the guide 72 is composed of the transverse edge portion of a folded panel whose longitudinal edge portion is connected to the inner surface of the front vertical wall 21b by connecting bolts 73 so as to provide a guide surface 72a that faces upward in the cutting blade housing and extends from the lower end portion of the front vertical wall 21b towards the rear inside the cutting blade housing. The guide 72 is composed of two divided folded panels that are divided in the transverse direction of the cutting blade housing 21. The guide surface 72a is positioned further forward than the front baffle plate 40 and at the same height as the bottom surface 71a of the corner guide 71.

In other words, the guide surface 72a in the guide 72 guides the flow of wind from the corner guide 71, as well as the wind that is generated by the rotation of the wind-generating vanes 29 of the rotating cutting blades 22L, 22C, 22R and that is allowed to leak from the rotation zones 22LA, 22CA, 22RA into the vicinity of the front vertical wall 21b through the area under the front baffle plate 40, so that the wind flows along the front vertical wall 21b toward the cut-grass discharge port 23.

Specifically, the drive power of the engine 5 is transmitted to the cutting blade drive mechanism 20D by the rotating shaft 11, and the cutting blade drive shafts 27 are driven by the cutting blade drive mechanism 20D, whereby the rotating cutting blades 22L, 22C, 22R are driven in the rotation direction A shown in FIG. 3 about the vertical center axis X of the cutting blade drive shafts 27 in the cutting blade housing. The discharge-side rotating cutting blade 22R and the rotating cutting blade 22L on the side opposite the discharge side then introduce the air outside the cutting blade housing 21 into the rotation zones 22LA, 22RA from below the front vertical wall 21b, the transverse vertical wall 21d, and the rear vertical wall 21c of the cutting blade housing 21 through the blowing action of the wind-generating vanes 29, and create an airflow, and turf and grass are cut by the cutting blades 28 while being drawn upright by the airflow. Through the blowing action of the wind-generating vanes 29, the center rotating cutting blade 22C introduces the air outside the cutting blade housing 21 to the rotation zone 22CA from below the front vertical wall 21b of the cutting blade housing 21, and from below the rear vertical wall 21c, the ventilation hole 33, and the second ventilation holes 34 through the area below the rear baffle plate 50 to create an airflow, and the turf and grass are cut by the cutting blades 28 while being drawn upright by the airflow. The gauge shafts 25 in contact with the ground surface support the cutting blade housing 21 in contact with the ground surface, and maintain the rotating cutting blades 22L, 22C, 22R at the set height above the ground as the set mowing height. The height at which mowing is performed by the rotating cutting blades 22L, 22C, 22R is thereby set as the set mowing height. The grass that is cut by the rotating cutting blades 22L, 22C, 22R is guided by the rear baffle plate 50 and the front baffle plate 40 in the wind generated by the wind-generating vanes 29 of the rotating cutting blades 22L, 22C, 22R; is conveyed through the cutting blade housing 21 to the transverse end at which the cut-grass discharge port 23 is positioned; and is discharged sideways to the outside of the cutting blade housing 21 from the cut-grass discharge port 23. At this time, even when the wind generated by the rotating cutting blades 22L, 22C, 22R leaks towards the front of the cutting blade housing from the front baffle plate 40, the flow of the leaked wind is guided by the bottom surface 71a of the corner guide 71 or by the guide surface 72a of the guide 72 along the transverse vertical wall 21d or the front vertical wall 21b towards the cut-grass discharge port 23, and is less prone to leak to the outside from the corner portion 70 or front vertical wall 21b of the cutting blade housing 21.

As shown in FIG. 3, the mower 20 has pairs of ground rollers 61, 61, 62, 62 that are provided in the transverse direction of the cutting blade housing in front of and behind the center portion in the transverse direction of the cutting blade housing 21.

The front pair of left and right ground rollers 61, 61 is supported so as to be capable of rotating via a support shaft 64 on a pair of left and right support members 63 connected to the front vertical wall 21b of the cutting blade housing 21. When a protrusion in the ground surface or another obstacle is encountered, the front pair of left and right ground rollers 61, 61 rolls over the obstacle while supporting the front end of the cutting blade housing 21 near the ground so as not to collide with the obstacle.

As shown in FIGS. 3, 4, and 5, the rear pair of left and right ground rollers 62, 62 is supported so as to be capable of rotating via a support shaft 65 in a position to the rear of the ventilation hole 33 of the pair of left and right support members 60, 60 that are connected between the rear baffle plate 50 and the linear middle wall portion 32. When a protrusion in the ground surface or another obstacle is encountered, the rear pair of left and right ground rollers 62, 62 rolls over the obstacle while supporting the rear end of the cutting blade housing 21 near the ground so as not to collide with the obstacle. The pair of left and right ground rollers 62, 62 is supported in an arrangement in which the ground rollers 62 completely protrude to the rear of the ventilation hole 33 so as not to obstruct the airflow.

Other Embodiments

Instead of the configuration described in the embodiment above in which the rear ground rollers 62 are provided so that the ground rollers 62 completely protrude to the rear from the ventilation hole 33, a configuration may be adopted in which the front ends of the ground rollers 62 are placed inside the ventilation hole 33, and the ground rollers 62 are provided in a configuration in which the rollers protrude only partially to the rear from the ventilation hole 33 so that the rear ends of the ground rollers 62 protrude to the rear from the ventilation hole 33. The objects of the present invention can also be achieved in this case.

The objects of the present invention can also be achieved when sledges are used instead of the ground rollers 62. Accordingly, the ground rollers 62 or sledges are referred to generically as obstacle-surmounting ground units 62.

The ventilation hole (33 and/or 34) was formed in the rear vertical wall in the embodiment described above, but may also be formed in the rear baffle plate 50.

What is claimed is:

1. A mower comprising:
    a cutting blade housing having a top plate, a front vertical wall that depends from the top plate, and a cut-grass discharge port at one transverse end;
    rotating cutting blades that are arranged in a transverse direction within said cutting blade housing and each of which is capable of rotating about a vertical axis;
    a rear plate disposed behind said rotating cutting blades and along rotation zones of said rotating cutting blades;
    a rear vertical wall that is supported by said cutting blade housing in a position rearwardly of said rear plate and that forms a first ventilation hole in a center portion in said transverse direction of said cutting blade housing;
    an obstacle-surmounting ground unit for supporting a rear end portion of said cutting blade housing; and
    a supporting portion for supporting said ground unit so that at least a portion of said obstacle-surmounting ground unit protrudes from said ventilation hole to the rear of said ventilation hole.

2. The mower according to claim 1, wherein
    said supporting portion has a pair of support members; and
    each of said support members extends through said first ventilation hole and is connected to said rear plate and said rear vertical wall.

3. The mower according to claim 2, further comprising second ventilation holes formed in a position near said ventilation hole of said rear vertical wall.

4. The mower according to claim 2, wherein said first ventilation hole has a shape that opens downward and is formed by a pair of edges, of said rear vertical wall, that extend in a vertical direction.

5. The mower according to claim 4, wherein said pair of support members is in contact with and fixed to said pair of edges.

6. The mower according to claim 3, wherein the second ventilation holes are generally rectangular in shape.

7. The mower according to claim 2, wherein:
    the ground unit is a ground roller capable of rotating about an shaft; and
    said shaft is supported by said pair of support members.

8. The mower according to claim 1, wherein
    said first ventilation hole is formed in a linear middle wall portion of said rear vertical wall; and
    the middle wall portion is supported by a top wall positioned above the middle wall portion.

* * * * *